United States Patent [19]

Koch

[11] 4,092,015

[45] May 30, 1978

[54] EXTRUDER SCREW

[75] Inventor: Klaus Koch, Gleidingen, Germany

[73] Assignee: Paul Troester Maschinenfabrik, Hanover, Germany

[21] Appl. No.: 724,941

[22] Filed: Sep. 20, 1976

[30] Foreign Application Priority Data

Sep. 24, 1975 Germany .......................... 2542515

[51] Int. Cl.$^2$ .............................................. A21C 1/06
[52] U.S. Cl. ...................................... 366/81; 425/208; 425/209
[58] Field of Search ................. 259/191, 192, 193, 97; 425/208, 209

[56] References Cited

U.S. PATENT DOCUMENTS

| | | | |
|---|---|---|---|
| 3,375,549 | 4/1968 | Geyer | 259/192 |
| 3,652,064 | 3/1972 | Lehnen | 259/97 X |
| 3,687,423 | 8/1972 | Koch et al. | 259/191 X |
| 3,888,469 | 6/1975 | Geyer | 259/191 |
| 3,897,938 | 8/1975 | Kim | 259/191 |

Primary Examiner—Herbert F. Ross
Attorney, Agent, or Firm—Robert E. Burns; Emmanuel J. Lobato; Bruce L. Adams

[57] ABSTRACT

The screw for an extruder for working plastic material and rubber comprises along its length several zones with different numbers of threads or webs. In at least one portion of its length, the screw has a plurality of single thread zones alternating with two-thread zones. In each of the two-thread zones there are two webs which are diametrically disposed and extend parallel to the axis of the screw. These axially extending webs have inclined or wedge shaped flanks so that a wedge shaped aperture is formed between the cylinder wall of the extruder and the wedge shaped flanks of the axially extending webs. One web of the two-thread zone joins the web of the preceding single thread zone and the other web of the two-thread zone joins the web of the following single thread zone at the points where the axially extending webs meet the webs of the two-thread zone.

9 Claims, 6 Drawing Figures

EXTRUDER SCREW

FIELD OF INVENTION

The present invention relates to an extruder screw for working plastic and rubber in a screw type extruder in the cylinder of which the extruder screw is rotatable and particularly to an extruder screw having several zones with different numbers of threads or webs along its length. In the following description the terms "screw" and "worm" are used interchangeably.

BACKGROUND OF THE INVENTION

Screw type extruders comprise a cylinder in which an extruder screw is rotatable. It is used for extruding plastic material, rubber and other thermoplasts and elastomers and other plastic masses. Screw type extruders have been used successfully for many decades for extruding such material. Many different screw constructions have been developed in order to obtain good homogenization, disintegration and working of the materials according to the requirements of the different kinds of material. With very long extruders or with several extruders arranged in series, materials which are difficult to work can be broken up and homogenized in the desired manner particularly when the extruder is heated or cooled in selected places. However, the large number of existing extruder screw constructions indicates that working with screw type extruders is not without problems. If the working of the material takes places too rapidly and in too short a distance, the material being worked is heated to such extent that it can lose important characteristics or can be rendered completely worthless. If the working takes place too slowly, the material is often not fully worked when it leaves the extruder.

These problems are rendered more pressing by the fact that in general, worked and disintegrated material lies in the extruder together with unworked material which is fed with the worked material to the nozzle of the extruder. The worked and therefore more viscous material envelops the unworked and therefore less viscous material, thereby bestowing on it excellent sliding characteristics and leading to the possibility that the unworked material is forwarded to the screw tip.

It has been known very early that the working of an extruder screw can be considerably improved by providing in the web of the extruder screw openings which lead from the pressure side to the lee side of the web (DT-PS German Pat. No. 402879). It is now known that this improvement in the working of the extruder screw results from the fact that the frequency of occurrence of unworked material portions is much greater on the lee side than on the pressure side of the screw web. If the worked material on the pressure side of the screw web is permitted to pass through openings in the web and thus divide the stream of material in a screw passage into two parts, the unworked portion is thereby brought onto the pressure side of the screw web flank where it is more strongly worked than on the lee side.

However, for a long time the experts have not been able to develop this knowledge further. Instead, they have chosen other routes to separate the more viscous portion from the less viscous portion and to achieve in this manner that all portions are subjected to working in a particular short section of the extruder screw. DT-PS German Pat. No. 910218 shows a screw type press in which the screw is single threaded in an entrance portion, is double threaded in a working zone and is again single threaded in a discharge zone. Here, there is provided in the two thread part a screw web back over which the material must flow in passing from the first passage to the second passage. Through this screw web back, not only is the less viscous unworked material held back but also the round form of this screw web back performs a rolling mill operation on the material before it can enter the second screw passage. At the end of this rolling process, the material is sufficiently rolled out that it can pass between the round screw web back and the inner wall of the cylinder. This so far rolled material is later carried along by the following screw flank which is not rounded. With this known extruder screw the unworked material is pushed under relatively low pressure in a direction parallel to the round screw web back over which the worked fused material is led forwardly to the ejection zone thus in a forward direction and is repeatedly subjected to the rolling mill working of this round back. For plastic material only one two screw part is needed; for rubber it is necessary to have at least two such parts. With this screw extruder surprisingly good results are obtained. The material is received in a well homogenized state. The temperature of the extrusion is wholly uniform.

An identical arrangement of the screw web is disclosed in German Pat. No. 1,207,074. However, here the screw web back is no longer round but is formed the same as the other screw webs. For plastic, this machine works in the same manner by separating the more viscous and less viscous parts but without the rolling mill working of the round back.

Despite the good results obtained with both of these extruder screw designs, they are not suitable for all materials. As all of the material must cross the screw web back one or more times, the amount of energy required to drive the screw is not unimportant. The temperature division along the screw is not uniform. The screw geometry does not exclude the possibility of there being places where the material remains for a longer time and is damaged or indeed destroyed by the high temperature.

Only after the present working processes became known did the technique again seize upon the idea of dividing the material found in the screw passage. The DT-AS No. 1302096 shows one possibility of this by two single thread helical webs of like pitch overlapping one another so that there is a short section of a two thread screw between the single thread sections. Also, in this manner is it achieved that the material from the lee side in the two thread portion is so led that it lies on the pressure side of the flank of the screw web in the following single thread part. By the DT-AS No. 1302096 this is achieved without any inherent resistance. It is otherwise with DT-PS Pat. No. 1816440. Here, the web pieces at the places where the material stream in the screw passage is divided into two passages are transverse to the direction of the screw passage. These transversely extending web pieces where extensive unworked portions of the material are present represent a very strong resistance which not only greatly increases the power required to drive the machine but also severely stresses the material to be worked.

This construction uses similar working means which have proved successful as a shearing part at the end of a preferably single thread screw. This shearing part is multiple threaded and its screw webs are formed as forwarding webs. Between the screw webs lie screw passages which are drawn through from each essentially axial web and whose profile forms a wedge space with the extruder cylinder which envelops the screw. Such a shearing part is known through DT-OS No. 1729364. Here, preferably in a single thread screw the stream of material to be worked at the end of the working zone is divided into a plurality of stream parts and each stream part is forced over a transverse web in the screw passage. In this manner the already worked material is subjected to outstanding shearing and thereby homogenization. The division into several screw passages and the resulting simultaneous leading of the material over a transverse web in each of the passages serves as the working means for carrying out this process. Such working means which are very good for the shearing of already worked material are not however so well suited for subjecting less viscous unworked material to a working process. This is indeed also possible but however the material to be worked is subjected to high warming particularly when the transverse webs in the screw passage are short.

SUMMARY OF THE INVENTION

The present invention is directed to the problem of achieving with a short extruder screw, complete working, disintegration and homogenization of the material with limited expenditure of energy and with substantially uniform temperature over the entire length of the working section of the extruder screw.

In accordance with the invention, the extruder screw has in at least a portion of its length a plurality of alternately arranged single thread zones and two-thread zones of a length of half a screw convolution and that each two thread zone has two wedge shaped webs parallel to the axis so that a wedge space is formed between the inclined flanks of the axially extending webs and the inner wall of the extruder cylinder. One screw web of the two-threaded zone joins the screw web of the preceding one thread zone while the other screw web of the two thread zone joins the screw web of the following one thread zone at the points where the axially extending webs meet the screw webs of the two-thread zone.

The extruder screw in accordance with the invention achieves particularly good results through the combination of the above mentioned working means which work in a particular manner. The screw is so constructed that each portion of material in passing through this specially formed screw section must pass over an axially extending web several times. However, the whole material does not pass simultaneously over axially extending webs. This occurs rather successively so that a uniform temperature distribution is maintained over the entire length of the working section of the screw. The achieved geometry of the outer surface of the screw is particularly good because the material passing through the wedge space has the possibility of lateral expansion before the wedge space as the reduction in depth of the passageway corresponds to an increase in the passageway width. For the space which is first reached by the material and which is hence crossed by less worked material, this is also true for the zone behind the space. Through this particular arrangement it is achieved that the material is constantly changed from the lee side of a screw web to the pressure side of the screw web and vice versa. As this constantly occurs, it is clear that a particularly good breaking up and homogenization of the material to be worked is achieved in a short screw length.

The construction is particularly simple when each single thread zone has only a full winding. Preferably, each zone including the two thread zones has a length which is equal to the diameter of the extruder screw. An extruder screw of this kind can be easily made by making each of the single thread zones and the double thread zones as individual pieces and then joining them together.

Very good working of the material is achieved when the backs of the axially extending webs have the same radius over an angular extent of at least 20°. There is thus provided a longer space for the breaking up of the particles which are difficult to break up.

For many materials, the extruder screw can be further improved by providing in the flanks of the axially extending webs, a plurality of grooves which extend in a circumferential direction (perpendicular to the axial direction). These have a particularly good effect closely behind the entrance zone as here the non-viscous portions are divided into smaller parts.

In a subsequent zone of the screw, it is advantageous when the backs of the axially extending webs are formed with grooves which extend at a sharp angle to the circumferential direction or to the axial direction. The unworked material getting into these grooves is led in a simple manner into the space between the web backs and the inner wall of the cylinder.

BRIEF DESCRIPTION OF DRAWINGS

The nature, characteristics and advantages of the invention will be more fully understood from the following description in conjunction with the accompanying drawings which show schematically a preferred embodiment of the invention. In the drawings.

DESCRIPTION OF PREFERRED EMBODIMENT

Figure 1:
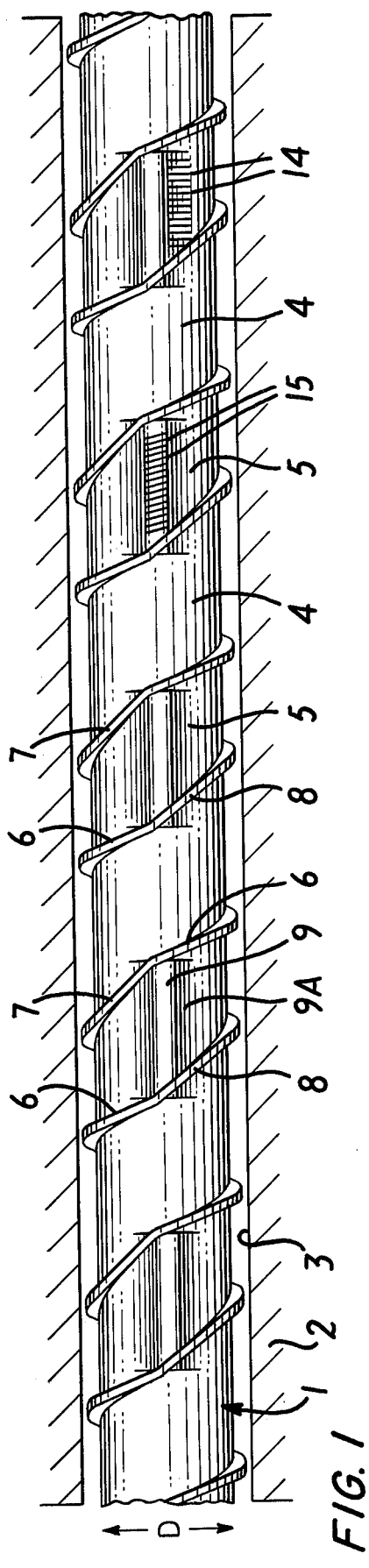
FIG. 1 is an elevation of an extruder screw in accordance with the invention.
Figure 2:
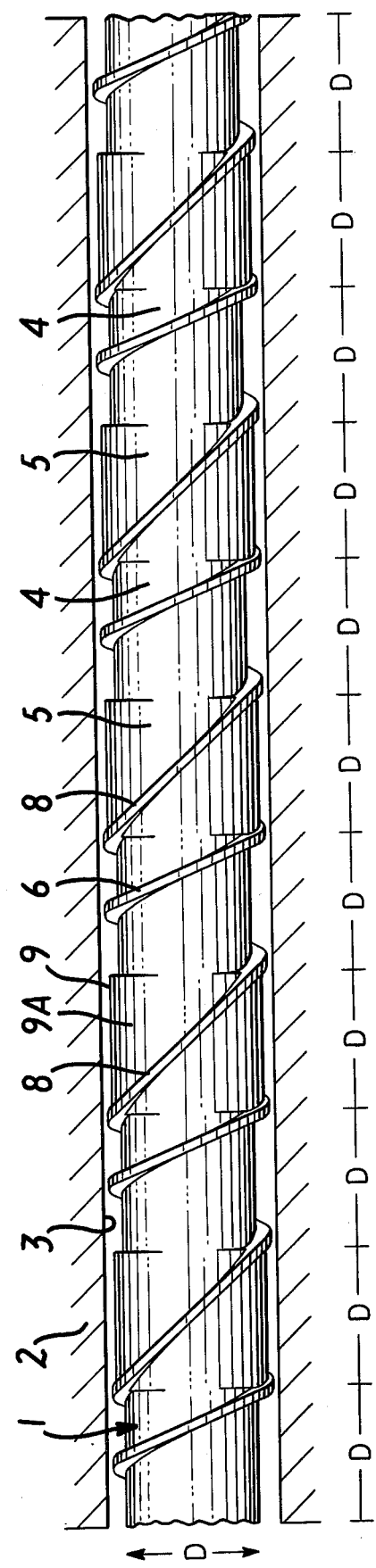
FIG. 2 is an elevation with the extruder screw turned 90° from the position shown in FIG. 1.

As illustrated in the drawings the extruder screw 1 is rotatable in the cylinder 2 of the screw extruder having a cylindrical inner wall 3. The extruder screw is made up of a multiplicity of single thread zones 4 and double thread zones 5. Each zone can be produced as a single workpiece whereupon the several workpieces are joined together. However, the screw can also be made as a single workpiece.

Each single thread zone 4 has a single web 6 which in the example shown in the drawings extends one convolution of 360° in each single thread zone 4.

Figure 5:
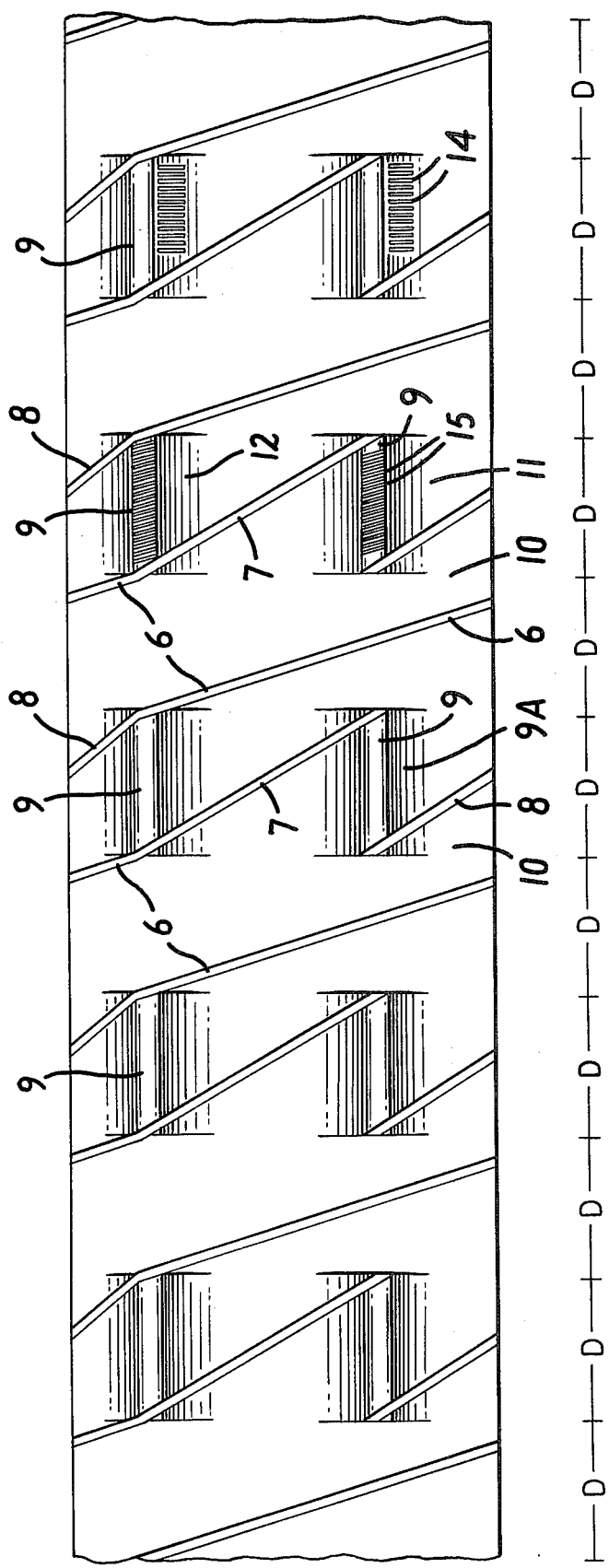
FIG. 5 is a schematic developed view of the outer surface of the extruder screw.

Each of the two thread zones 5 has two screw webs 7 and 8, each of which extends 180° in the illustrated example. The two webs 7 and 8 are disposed on opposite sides of the cylinder as seen in FIG. 5. If the length of the two thread zones is the same as that of the single thread zones, the screw webs 7 and 8 have a pitch equal to twice that of the screw web 6 in the single thread zones.

Figure 4:
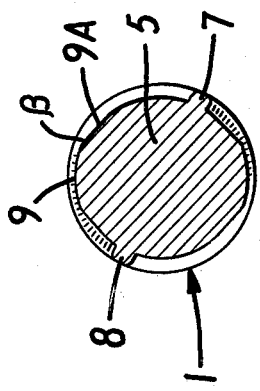
FIG. 4 is a cross section through a two-thread zone of the extruder screw.
Figure 6:
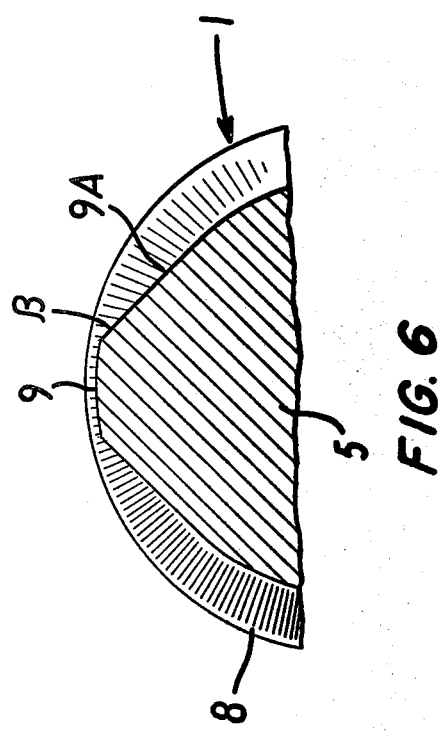
FIG. 6 is an enlarged fragmentary cross sectional view showing the shape of an axially extending web.

A further web 9 extends between the screw webs 7 and 8 in a direction parallel to the axis of the extruder screw. These webs 9 thus extend across the screw passage between the screw webs 7 and 8. As each two-thread zone 5 has two screw webs 7 and 8 and hence also two screw channels, it is also provided with two axially extending webs 9. These axially extending webs 9 are so formed that a wedge angle $\beta$ is included between the inner wall 3 of the cylinder and the flank 9A of the web 9. This is clear from the cross section shown in FIGS. 4 and 6. From the screw web 7, the bottom of the screw channel first extends with a constant radius and then extends tangentially and with a rounding of the back of the web 9. The cross section of the screw core thus has at this position two opposite portions with a radius which is greater than the radius of curvature of the inner wall of the cylinder and two portions perpendicular thereto in which the radius of curvature is substantially smaller and which form the axially extending webs 9. As seen in FIG. 4 the cross section of the screw core is at this position somewhat elliptical.

The individual zones 4 and 5 are put together so that the screw web 6 of a single thread zone begins where an axially extending web 9 meets the screw webs 7 and 8. Each screw web 6 of a single thread zone 4 ends where an axially extending web 9 meets the screw webs 7 and 8 of the two-thread zone. In this manner it is attained that a screw web 6 joins a screw web 7 on one side and joins a screw web 8 on the other side. Hence, from the channel 10 of the single thread zone 4 the material can enter the channel 11 or the channel 12 of the two-thread zone 5. In the channel 11 enters that material which was on the lee side of the screw web in the single thread zone, thus material in which the frequency of occurrence of unworked material pieces is greater. On the contrary, the material on the pressure side enters the channel 12 where it has a longer way to go to an axially extending web 9. This already further dispersed material can during this longer passage further relax so that unworked material or relaxed material passes over the axially extending webs 9.

Through this particular arrangement it is possible to achieve a limited energy expenditure since at each division point where the screw channel 10 leads into two screw channels 11 and 12, a part of the material passes over an axially extending web 9 while another part of the material in the screw channel 12 continues further before it must pass over an axially extending web 9.

Preferably, the length of each of the zones 4 and 5 is selected so as to be equal to the length D of the diameter of the extruder screw. However, this is not necessary. Likewise, it is not necessary for the screw web 6 in the single thread zone 4 to extend a single full turn around the screw core as it can extend less than the full turn or more than a full turn.

In the entrance portion of the extruder screw, it is desirable to provide in the flanks 9A of the axially extending webs 9, grooves 14 which extend circumferentially (perpendicular to the axial direction). Such grooves 14 strengthen the rolling mill working while they hinder the unworked or relaxed part from wandering around the free edges of the axially extending web 9.

It can also be desirable to provide in the backs of the webs 9 grooves 15 which extend at a sharp angle to the circumferential direction or axial direction. However, at the end of the working zone, it is preferable to have the backs of the webs 9 smooth.

Figure 3:
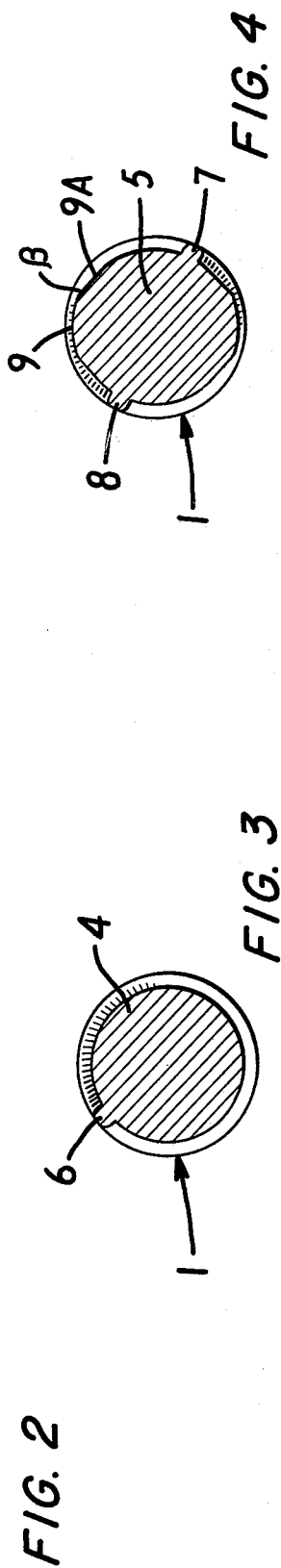
FIG. 3 is a cross section through a single thread zone of the extruder screw.

The cross section of the two thread part preferably corresponds approximately to the shape of an ellipse as shown in FIG. 4 while the cross section in the single thread part is circular as seen in FIG. 3.

It is preferable for the axially extending webs 9 to be approximately 0.001 to 0.04 D, lower than the other webs of the extruder screw which serve as forwarding webs, "D" being the diameter of the extruder screw. The axially extending webs 9 are preferably somewhat lower in an entrance portion of the screw than in an end portion of the working zone. The gap between the axially extending webs 9 and the inner wall of the extruder cylinder is thus suited to the viscosity of the material to be worked. In this manner it is achieved that the disintegration of the material to be worked takes place throughout the length of the working zone which not only prevents overheating close behind the entrance zone, unnecessary energy expenditure and undesirable overloading of the extruder screw but also achieves a thorough disintegration, working and homogenization of the material in an effective and efficient manner.

For the working of plastic material, it is desirable not to make the described screw part composed of one thread and multiple thread parts too short in order to attain the desired pressure build up and plastification. With rubber, this part can be somewhat shorter.

While a preferred embodiment of the invention has been illustrated in the drawings and is herein particularly described, it will be understood that the invention is in no way limited to this embodiment since many modifications and variations may be made.

What I claim is:

1. An extruder for the working of plastic material and rubber comprising an extruding cylinder and an extruding screw rotating in the cylinder, said screw having a core and helical webs on said core with screw channels between said webs and having along its length several zones with different numbers of webs, said screw having in at least one part of its length a plurality of single thread zones alternating with a plurality of two-thread zones, each of said two-thread zones having two screw channels and two webs extending parallel to the axis of said screw across said screw channels respectively and having wedge-shaped flanks so that a wedge-shaped aperture is formed between the cylinder wall and the wedge-shaped flanks of said axially extending webs, one helical web of each two-thread zone joining the helical web of the preceding single thread zone and the other helical web of said two-thread zone joining the helical web of the following single thread zone where the axially extending webs meet the helical webs of the two-thread zone.

2. An extruder according to claim 1, in which said helical web in said single thread zone makes one full turn.

3. An extruder according to claim 1, in which each of said zones has a length approximately equal to the diameter of the extruding screw.

4. An extruder according to claim 1, in which the back of each of said axially extending webs has a constant radius through an angle of at least 20°.

5. An extruder according to claim 1, in which the entrance flank of at least one of said axially extending webs has therein a multiplicity of grooves extending circumferentially, i.e., perpendicular to the axis of rotation of said extruding screw.

6. An extruder according to claim 1, in which the back of at least one of said axially extending webs has therein a multiplicity of grooves which extend at an acute angle to the circumferential or axial direction.

7. An extruder according to claim 1, in which each of said helical webs in said two-thread zone extends approximately 80° around said extruding screw.

8. An extruder according to claim 7, in which each of said helical webs in said two-thread zones has a pitch equal to twice that of said helical web in the single thread zones.

9. An extruder according to claim 7, in which said two axially extending webs of each of said two-thread zones are approximately opposite one another.

* * * * *